(12) United States Patent
Tsuji et al.

(10) Patent No.: US 6,420,037 B1
(45) Date of Patent: Jul. 16, 2002

(54) SILICONE RUBBER BASED COATING COMPOSITION FOR AIR BAGS

(75) Inventors: Yuichi Tsuji; Akito Nakamura, both of Chiba Prefecture (JP)

(73) Assignee: Dow Corning Toray Silicone Co. Ltd., Tokyo (JP)

( * ) Notice: Subject to any disclaimer, the term of this patent is extended or adjusted under 35 U.S.C. 154(b) by 0 days.

(21) Appl. No.: 09/526,953

(22) Filed: Mar. 16, 2000

(30) Foreign Application Priority Data

Apr. 21, 1999 (JP) ............................................ 11-113639

(51) Int. Cl.[7] .............................................. B32B 25/20
(52) U.S. Cl. ........................ 428/447; 524/588; 524/444; 524/442; 524/494; 524/492; 528/32; 528/31; 528/15; 549/215; 280/728.1; 526/478
(58) Field of Search ................................ 524/588, 444, 524/442, 494, 452; 528/32, 31, 15; 549/215; 280/728.1; 525/478; 428/447

(56) References Cited

U.S. PATENT DOCUMENTS

| 3,317,455 | A | | 5/1967 | Blome et al. ................. 260/37 |
| 4,861,804 | A | | 8/1989 | Nakanishi .................... 521/54 |
| 5,128,175 | A | | 7/1992 | Yamanishi et al. ......... 427/54.1 |
| 5,246,973 | A | * | 9/1993 | Nakamura et al. |
| 5,378,533 | A | | 1/1995 | Ota ......................... 428/304.4 |
| 5,614,563 | A | * | 3/1997 | Ishida et al. |
| 5,750,581 | A | | 5/1998 | Brennenstuhl et al. ........ 521/54 |
| 5,789,084 | A | | 8/1998 | Nakamura et al. .......... 428/447 |
| 5,877,256 | A | * | 3/1999 | Nakamura et al. |

FOREIGN PATENT DOCUMENTS

| EP | 0391412 A1 | 10/1990 | ........... H01B/11/18 |
| EP | 0553843 A2 | 8/1993 | ........... C08L/83/04 |
| EP | 0821027 A2 | 1/1998 | .............. C08J/9/14 |
| JP | 5-214295 | 8/1993 | |
| JP | 10-77409 | * 3/1998 | |
| JP | 10168390 | 6/1998 | ......... C09D/183/04 |

OTHER PUBLICATIONS

Silicones by Freeman, published by The plastic Institute, 1962, Table 2.2.*

* cited by examiner

Primary Examiner—Robert Dawson
Assistant Examiner—Kim-Liang Peng
(74) Attorney, Agent, or Firm—William F. Boley; Jennifer S. Warren; Jim L. De Cesare

(57) ABSTRACT

A silicone rubber based coating composition for air bags comprising about 0.1 to 50 wt % of spherical powder with an average particle size of about 10 $\mu$m to 300 $\mu$m.

4 Claims, No Drawings

SILICONE RUBBER BASED COATING COMPOSITION FOR AIR BAGS

BACKGROUND OF INVENTION

The present invention relates to a silicone rubber based coating composition for air bags used in automobile air bags and such. More specifically, it relates to a silicone rubber based coating composition for air bags which is superior in terms of thin film coating properties in the absence of solvents, and, upon curing, possesses an adhesive strength such that it is capable of withstanding the impact of distension at high temperatures, and, moreover, exhibits an extremely low tackiness of the coating film surface.

Base fabrics made by coating fabrics of synthetic fibers, such as Nylon 66, with silicone rubbers possess the advantage of superior temperature characteristics, flame resistance, and low degradation over time, and have been used in automobile air bags and such. Usually, when a silicone rubber is coated on a fabric of synthetic fiber, it is applied in a thin, uniform layer, with toluene, xylene, and other diluent solvents used so as to obtain a sufficient strength of adhesion to the foundation fabric. However, in order to meet the recent demand for solvent-free processes for the purposes of environmental protection, there have been offered liquid silicone rubber compositions which permit coating without using solvents (see Japanese Kokai (Unexamined) Patent Publication No. Hei 05(1993)-214295). However, the problem with coated base fabrics made with the help of such liquid silicone rubber compositions is that because the coating film surface retains a certain amount of tackiness after the curing of the silicone rubber, its processability during sewing is inferior and the coating film adheres together when folded and stored, which makes it necessary to dust the coating film surface with talc, calcium carbonate, or clay.

As a result of in-depth investigations aimed at eliminating the above described problems, the authors of the present invention discovered that a liquid silicone rubber composition obtained by admixing a specific organotitanium compound exhibits excellent thin film coating properties and penetrability with respect to synthetic fiber fabrics, as well as provides for a reduction in the tackiness of the coating film surface, and these characteristic make the composition especially useful as a liquid silicone rubber coating composition for air bags (see Japanese Kokai (Unexamined) Patent Publication No. Hei 09(1997)-87585). Later, as a result of further investigations, they discovered that if a certain amount of a specific spherical powder was compounded with the liquid silicone rubber composition, the tackiness of the coating film surface upon curing was noticeably reduced, thus arriving at the present invention. Namely, it is an object of the present invention to provide a silicone rubber based coating composition for air bags which is superior in its characteristics as a coating for air bags and, in particular, exhibits no coating film surface tackiness.

SUMMARY OF INVENTION

A silicone rubber based coating composition for air bags comprising about 0.1 to 50 wt % of a spherical powder with an average particle size of about 10 μm to 300 μm.

DESCRIPTION OF INVENTION

The above described object is accomplished by using a silicone rubber based coating composition for air bags which is characterized by containing about 0.1 to 50 wt % of a spherical powder with an average particle size of about 10 μm to 300 μm. To explain the preceding in greater detail, the spherical powder used in the present invention is a component believed to be essential in the reduction of the surface tackiness of the air bag's coating film. It is necessary that such spherical powder should have an average particle size within the range of from 10 μm to 300 μm. Hollow aluminosilicate powders, glass spheres, silica spheres, shirasu spheres, carbon spheres, alumina spheres, plastic spheres, hollow silicone resin powders, and other hollow powders; alumina powders, glass powders, plastic powders, and the like are suggested as such spherical powders. Among them, the hollow powders are preferable because they can be uniformly dispersed over the surface of the coating film of the air bag. In addition, it is preferable that the viscosity at 25° C. of the silicone rubber based coating composition of the present invention containing such spherical powders should be within a range of from 5 Pa·s to 300 Pa·s.

The silicone rubber based coating composition of the present invention contained about 0.1 to 50 wt % of the above described spherical powder. Well-known prior-art silicone rubber compositions used as air bag coating agents can be used here as the silicone rubber based composition containing the spherical powder. Organic peroxide curing type silicone rubber compositions, addition reaction curing type silicone rubber compositions, condensation reaction curing type silicone rubber compositions, silicone latexes which turn into rubber via crosslinking as a result of water evaporation can all be used. Among them, addition reaction curing type silicone rubber compositions are preferable, such as an addition reaction curing type liquid silicone rubber compositions comprising:

(A) 100 parts by weight of a diorganopolysiloxane having a viscosity at 25° C. of about 100 to 100,000 mPa·s and having at least two alkenyl groups in one molecule (B) an organohydrogenpolysiloxane having at least three silicon-bonded hydrogen atoms in one molecule in an amount such that the mole ratio of the silicon-bonded hydrogen atoms in this component to the alkenyl groups in component (A) is about 0.6:1 to 20:1, (C) a platinum catalyst in an amount providing about 0.1 to 500 parts by weight of platinum metal per 1,000,000 parts by weight of component (A), and (D) about 0.1 to 100 parts by weight of a spherical powder whose average particle size is about 10 μm to 300 μm.

To provide further explanations regarding the addition reaction curing type silicone rubber composition, the diorganopolysiloxane of component (A) is the main ingredient, and it is necessary for it to have at least two alkenyl groups in one molecule. Such diorganopolysiloxane is a substantially linear organopolysiloxane represented by the average unit formula:

$$RnSiO\frac{4-n}{2}$$

where R is a substituted or non-substituted monovalent hydrocarbon group exemplified by alkyl groups such as methyl, ethyl, and propyl; alkenyl groups such as vinyl and allyl; aryl groups such as phenyl and tolyl; and halogenated alkyl groups such as 3,3,3-trifluoropropyl. The subscript n is about 1.9 to 2.1. It is preferred that the diorganopolysiloxane have a viscosity at 25° C. of about 100 to 100,000 mPa·s, with a viscosity at 25° C. of 1000 mPa·s to 50,000 mPa·s being even more preferable when the strength of the silicone rubber coating film, compounding properties, and the like are taken into consideration. Specific examples of the diorganopolysiloxane include dimethylpolysiloxane endblocked with dimethylvinylsiloxy groups at both terminals, copolymers of methylvinylsiloxane and dimethylsiloxane endblocked with dimethylvinylsiloxy groups at both terminals, copolymers of methylphenylsiloxane and dimethylsiloxane endblocked with dimethylvinylsiloxy groups at both terminals, and copolymers of methylvinylsiloxane and methyl (3,3,3-trifluoropropyl)siloxane endblocked with dimethylvinylsiloxy groups at both terminals.

The organohydrogenpolysiloxane of component (B), which has at least three silicon-bonded hydrogen atoms in one molecule, is a crosslinking agent. Such organohydrogenpolysiloxane is exemplified by methylhydrogenpolysiloxane endblocked with trimethylsiloxy groups at both terminals, copolymers of methylhydrogensiloxane and dimethylsiloxane endblocked with trimethylsiloxy groups at both terminals, copolymers of methylhydrogensiloxane and methylphenylsiloxane endblocked with dimethylphenylsiloxy groups at both terminals, cyclic methylhydrogenpolysiloxane, copolymers made up of dimethylhydrogensiloxy units and $SiO_{4/2}$ units. The viscosity of the organopolysiloxane is usually in the range of from 1 mPa·s to 1,000 mPa·s at 25° C. The amount of this component is an amount such that the ratio of the moles of the silicon-bonded hydrogen atoms in the organohydrogenpolysiloxane to the moles of the alkenyl groups in component (A) is about 0.6:1 to 20:1, with about 1:1 to 10:1 being preferred.

The platinum catalyst of component (C) is used to effect curing the composition of the present invention, and is exemplified by platinum micropowder, chloroplatinic acid, olefin complexes of chloroplatinic acid, diketone complexes of platinum, alcohol solutions of chloroplatinic acid, and complexes of chloroplatinic acid with alkenylsiloxanes. The amount of this component, in terms of platinum metal, is usually within the range of from 0.1 parts by weight to 500 parts by weight, and, preferably, from 1 part by weight to 50 parts by weight, per 1,000,000 parts by weight of component (A). This is due to the fact that when it is less than 0.1 parts by weight, the reaction does not proceed completely, and when it exceeds 500 parts by weight, it is not economically efficient.

The spherical powder of component (D) is the same powder as the one described above, exemplified by the same specific powders. The amount of the spherical powder can be within a range of from 0.1 part by weight to 100 parts by weight per 100 parts by weight of component (A), with the amount being such that its proportion in the coating composition for air bags of the present invention is within the range of from 0.1 wt % to 50 wt %.

The addition reaction curing type silicone rubber composition of the present invention consists of the above described components (A) through (D), but in addition to these components, it is desirable to use a cure inhibitor exemplified by 3-methyl-1-butyne-3-ol, 3,5-dimethyl-1-hexyne-3-ol, phenylbutynol and other alkyne alcohols, 3-methyl-3-pentene-1-yne, 3,5-dimethyl-3-hexene-1-yne, and other ene-yne compounds, tetramethyltetravinylcyclotetrasiloxane, benzotriazole, and the like. The amount of these cure inhibitors is usually within the range of from 0.01 parts by weight to 10 parts by weight per 100 parts by weight of component (A).

In addition, in order to improve the mechanical strength of the coating film, silica micropowders may be compounded therewith as reinforcing fillers. Such silica micropowders include fumed silica and other dry process silicas, precipitated silica, and hydrophobic silica obtained by surface treating the surface of the above silicas with organochlorosilane, organoalkoxysilane, organosilazane, diorganocyclopolysiloxane, and the like. Silica micropowders with a specific surface area of not less than 50 $m^2$/g are preferable. The amount of this silica micropowder is, preferably, within the range of from 5 parts by weight to 50 parts by weight, and even more preferably, from 5 parts by weight to 40 parts by weight, per 100 parts by weight of component (A).

In addition, in order to improve the mechanical strength of the coating film, organopolysiloxane resins may be compounded therewith. Examples of such resins include resins made up of $(CH_3)_3SiO_{1/2}$ units and $SiO_{4/2}$ units, resins made up of $(CH_3)_3SiO_{1/2}$ units and $(CH_2\!\!=\!\!CH)SiO_{3/2}$ units, resins made up of $(CH_2\!\!=\!\!CH)(CH_3)_2SiO_{1/2}$ units and $SiO_{4/2}$ units, and resins made up of $(CH_2\!\!=\!\!CH)(CH_3)_2SiO_{1/2}$ units, $(CH_2\!\!=\!\!CH)SiO_{3/2}$ units, and $SiO_{4/2}$ units. Resins containing vinyl groups are preferable because they improve the strength of the silicone rubber coating film. In addition, resins that are liquid at normal temperature, or solid but possessing compatibility with component (A), are preferable. In order to achieve better penetrability with respect to synthetic fiber fabrics while simultaneously improving thin film coating properties, the amount of this component is, preferably, about 5 to 80 parts by weight, and even more preferably, about 10 to 80 parts by weight per 100 parts by weight of component (A).

In addition, organotitanium compounds may be added in order to improve the adhesion of the coating film to the fabric of synthetic fiber used for air bags, and, furthermore, to reduce the tackiness of the coating film surface upon curing. Tetraisopropyl titanate, tetrabutyl titanate, tetraoctyl titanate, and other organotitanate esters; diisopropoxybis (acetylacetonate)titanium, diisopropoxybis(ethyl acetoacetate)titanium, and other chelated titanium compounds are suggested as examples of such organotitanium compounds. The amount of this component is, preferably, within the range of from 1 part by weight to 5 parts by weight per 100 parts by weight of component (A). If the amount of the organotitanium compound exceeds 5 parts by weight per 100 parts by weight of component (A), the storage stability of the composition of the present invention decreases, and if it becomes less than 0.1 part by weight, then it loses effectiveness in terms of reducing the tackiness of the coating film surface after the curing of the silicone rubber.

Also, epoxy-containing organosilicon compounds may be added in order to improve the adhesion of the coating film to the synthetic fiber fabric used for air bags. Examples of such epoxy-containing organosilicon compounds include γ-glycidoxypropyltrimethoxysilane, β-(3,4-epoxycyclohexyl)ethyltrimethoxysilane, and other epoxy-containing organoalkoxysilanes; epoxy-containing organopolysiloxanes having alkoxy groups and vinyl groups bonded to silicon atoms, epoxy-containing organopolysiloxanes having hydrogen atoms bonded to silicon atoms, epoxy-containing organopolysiloxanes having alkoxy groups and hydrogen atoms bonded to silicon atoms, and other epoxy-containing organopolysiloxanes.

Furthermore, various additives well known in the art as additives for silicone rubber compositions, for example, quartz powder, diatomaceous earth, calcium carbonate, magnesium carbonate, and other extending fillers; cerium oxide, cerium hydroxide, iron oxide, and other agents imparting heat resistance; rouge, titanium oxide, carbon black, and other pigments; and flame retardants, can be added so long as this is not detrimental to the object of the present invention.

The addition reaction curing type liquid silicone rubber based coating composition can be easily produced by adding and uniformly mixing the above mentioned components (A) through (D) and, if necessary, other components. In particular, it is preferable to prepare a liquid silicone rubber base compound by mixing component (A) with a reinforcing silica micropowder under heating, and then adding other components thereto. Various mixing equipment used in the preparation of silicone rubber compositions, for example, kneader mixers, pressure kneader mixers, Ross mixers (from Charles Ross & Sons Co.), continuous kneader extruders, and other mixing equipment or kneading equipment can be used as the means for mixing the components.

The silicone rubber based coating composition of the present invention can be used to make coated base fabric for air bags by coating a fabric of synthetic fiber used for air bags, for example, Nylon 6, Nylon 66, Nylon 46, and other polyamide fiber fabrics, aramid fiber fabrics, fabrics of polyester fibers represented by polyethylene terephthalate, polyether imide fiber fabrics, fabrics of sulfone series fibers, carbon fiber fabrics, and the like therewith and then curing it. The coating amount is preferably not more than 150 g/m$^2$.

The air bag base fabric obtained by coating with the above described silicone rubber base composition is characterized in that the tackiness of the cured coating film surface is extremely low, which provides for superior processability during sewing and such without dusting the coating film surface with talc and calcium carbonate and eliminates the problem of adhesion of the coating film when folded and stored. For this reason, it is suitable for use as a coating agent for air bags, for which such characteristics are required.

Hereinbelow, the present invention is explained in detail by referring to examples. In the examples, the term "parts" means "parts by weight," and viscosity is a value measured at 25° C. In addition, "Me" represents a methyl group and "Vi" represents a vinyl group.

APPLICATION EXAMPLE 1

65 Parts dimethylpolysiloxane having both terminals of the molecular chain blocked with a dimethylvinylsiloxy group and a viscosity of 10,000 mPa·s, and 35 parts dimethylpolysiloxane having both terminals of the molecular chain blocked with a dimethylvinylsiloxy group and a viscosity of 400 mPa·s were charged into a Ross mixer. Next, 30 parts fumed silica with a specific surface area of 200 m$^2$/g, 5 parts hexamethyldisilazane, a surface treatment agent used for silica, and 2 parts of water were added, mixed therewith to homogeneity, and heated under vacuum to make a flowable liquid silicone rubber base compound. Subsequently, 10 parts by weight of a spherical hollow aluminosilicate powder (particle size: about 75 μm to 300 μm) were added to 100 parts of the liquid silicone rubber base compound and mixed therewith to homogeneity. A silicone rubber base coating composition for air bags was prepared by adding to the mixture 2.3 parts of dimethylsiloxane/methylhydrogensiloxane copolymer represented by formula

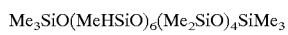

Me$_3$SiO(MeHSiO)$_6$(Me$_2$SiO)$_4$SiMe$_3$ 0.2 parts of a complex of chloroplatinic acid and divinyltetramethyldisiloxane (platinum content: 0.4 wt %), and, as a cure inhibitor, 0.06 parts 3,5-dimethyl-1-hexyne-3-ol, and mixing the ingredients to homogeneity. The viscosity of the composition was 110 Pa·s.

Next, the composition was applied to polyester film (thickness: 0.2 mm) so as to produce a layer with a thickness of 0.5 mm and cured by heating for 5 minutes at 120° C. The tackiness of the surface of the resultant coating film was evaluated by feel. The evaluation results were represented in the following manner.

Symbol ⊚: Not tacky (dry and rigid feel, absolutely no tackiness detected)
Symbol ○: Practically no tack (practically no tackiness detected)
Symbol Δ: Slightly tacky (sticky to the touch, some tackiness detected)
Symbol X: Tacky (noticeably sticky to the touch, tackiness detected)

The evaluation results are given in Table 1, below.

APPLICATION EXAMPLE 2

With the exception of adding 50 parts by weight of a spherical alumina powder (average particle size: 12 μm) instead of 10 parts by weight of the spherical hollow aluminosilicate powder added in Application Example 1, a silicone rubber based coating composition for air bags was prepared in the same manner as in Application Example 1. The viscosity of the composition was 75 Pa·s. A coated film was fabricated using this composition in the same manner as in Application Example 1, and the tackiness of its surface was evaluated. The results are given in Table 1, below.

APPLICATION EXAMPLE 3

With the exception of adding 15 parts by weight of a spherical silica hollow powder (average particle size: 60 μm) instead of 10 parts by weight of spherical hollow aluminosilicate powder added in Application Example 1, a silicone rubber based coating composition for air bags was prepared in the same manner as in Application Example 1. The viscosity of the composition was 80 Pa·s. A coated film was fabricated using this composition in the same manner as in Application Example 1, and the tackiness of its surface was evaluated. The results are given in Table 1, below.

Comparative Example 1

With the exception of not adding spherical hollow aluminosilicate powder, which was added in Application Example 1, a silicone rubber based coating composition for air bags was prepared in the same manner as in Application Example 1. The viscosity of the composition was 56 Pa·s. A coated film was fabricated using this composition in the same manner as in Application Example 1, and the tackiness of its surface was evaluated. The results are given in Table 1, below.

APPLICATION EXAMPLE 4

100 Parts dimethylpolysiloxane having both terminals of the molecular chain blocked with dimethylvinylsiloxy groups and a viscosity of 2,000 mPa·s, and 30 parts methylvinylpolysiloxane resin consisting of Vi(Me)$_2$SiO$_{1/2}$ units and SiO$_{4/2}$ units (Vi group content was 5.6 wt %, and viscosity was 230 mPa·s), were charged to a Ross mixer. Next, 12 parts fumed silica with a specific surface area of 200 m$^2$/g, 5 parts hexamethyldisilazane, a surface treatment agent for the silica, and 2 parts water were added and mixed therewith to homogeneity, and then heated under vacuum to make a flowable liquid silicone rubber base compound. Subsequently, a liquid silicone rubber composition was prepared by adding, to 100 parts of this silicone rubber base compound, 6 parts of a dimethylsiloxane/methylhydrogensiloxane copolymer represented by formula

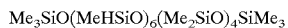

0.5 parts of a complex of chloroplatinic acid/divinyltetramethyldisiloxane (platinum content: 0.4 wt %), 0.4 parts 3,5-dimethyl-1-hexyne-3-ol as a cure inhibitor, 1 part of γ-glycidoxypropyltrimethoxysilane as an adhesion promoter, and 0.5 parts tetrabutyl titanate as a surface tack eliminator and mixing the ingredients to homogeneity. A silicone rubber based coating composition for air bags was obtained by adding 15 parts hollow glass beads with an average particle size of 100 μm to 100 parts of this liquid silicone rubber composition and mixing to homogeneity. The viscosity of the composition was 45 Pa·s.

Next, silicone rubber coated fabric was produced by coating the silicone rubber based coating composition on fabric made of Nylon 66 fiber (420 denier) using a coater to apply the minimum amount permitting uniform coating without irregularities and then curing it by heating for 2 minutes at 180° C. in a heating oven. After superimposing the coated surfaces of the coated fabric, applying a room temperature curable silicone rubber adhesive agent (trade name "SE9145. RTV," from Dow Corning Toray Silicone Co., Ltd., Japan) therebetween, and allowing the fabric to stand at room temperature for 7 days, it was cut into 2.5 cm (width)×10 cm (length) samples and subjected to a peel test to measure its adhesive strength. In addition, in order to carry out a Scott rubbing test, the samples were subjected to rubbing 1,000 times under a pressure of 2 kgf using a Scott rubbing testing machine, followed by visual evaluation of the state of peeling of the silicone rubber coating film from the fabric. The results are given in Table 2, below.

APPLICATION EXAMPLE 5

With the exception of compounding 2 parts of a spherical hollow plastic powder (where the hollow powder had an average particle size of 15 μm and was expanded to form particles with an average size of 50 μm at a temperature of about 130° C. to 180° C.), whose shell was made up of a vinylidene chloride/acrylonitrile copolymer, with isobutane contained inside it, instead of the 15 parts hollow glass beads added in Application Example 4, a silicone rubber based coating composition for air bags was prepared in the same manner as in Application Example 4. The viscosity of the composition was 33 Pa·s. A coated fabric was made using this composition in the same manner as in Application Example 4, and the tackiness of its surface was evaluated. The results are given in Table 2, below.

Comparative Example 2

With the exception of not compounding the glass beads added in Application Example 4, a silicone rubber based coating composition for air bags was prepared in the same manner as in Application Example 4. The viscosity of the composition was 26 Pa·s. A silicone rubber coated fabric was made using this composition in the same manner as in Application Example 4, and the tackiness of its surface was evaluated. The results are given in Table 2, below.

APPLICATION EXAMPLE 6

With the exception of not adding the tetrabutyl titanate added in Application Example 4, a liquid silicone rubber coating composition was prepared in the same manner as in Application Example 4. The viscosity of the composition was 42 Pa·s. A silicone rubber coated fabric was made using this composition in the same manner as in Application Example 4, and the tackiness of its surface was evaluated. The results are given in Table 3, below.

Comparative Example 3

With the exception of not adding the glass beads added in Application Example 6, a silicone rubber based coating composition for air bags was prepared in the same manner as in Application Example 6. The viscosity of the composition was 24 Pa·s. A silicone rubber coated fabric was made using this composition in the same manner as in Application Example 4, and the tackiness of its surface was evaluated. The results are given in Table 3, below.

TABLE 1

|  | Application Examples | | | Comparative Example |
|---|---|---|---|---|
|  | 1 | 2 | 3 | 1 |
| Surface tackiness | ◉ | ○ | ◉ | × |

TABLE 2

|  | Application Examples | | Comparative Example |
|---|---|---|---|
|  | 4 | 5 | 2 |
| Silicone rubber hardness (JIS Type A) | 55 | 55 | 52 |
| Minimum coating amount (g/m$^2$) | 40 | 35 | 40 |
| Adhesive strength (kgf/cm) | 3.5 | 3.3 | 3.5 |
| Scott rubbing test | Passed | Passed | Passed |
| Surface tackiness | ◉ | ◉ | ○ |

TABLE 3

|  | Application Example 6 | Comparative Example 3 |
|---|---|---|
| Silicone rubber hardness (JIS Type A) | 53 | 50 |
| Minimum coating amount (g/m$^2$) | 40 | 40 |
| Adhesive strength (kgf/cm) | 2.5 | 2.5 |
| Scott rubbing test | Passed | Passed |
| Surface tackiness | ○~◉ | × |

We claim:
1. A silicone rubber based coating composition for air bags which is an addition reaction curing type liquid silicone rubber composition comprising:
   (A) 100 parts by weight of a diorganopolysiloxane having a viscosity at 25° C. of about 100 to 100,000 mPa·s and at least two alkenyl groups in each molecule,
   (B) an organohydrogenpolysiloxane having at least three silicon-bonded hydrogen atoms in each molecule in an amount such that the mole ratio of the silicon-bonded hydrogen atoms in this component to the alkenyl groups in component (A) is within a range of about 0.6:1 to 20:1,
   (C) a platinum catalyst in an amount providing about 0.1 to 500 parts by weight of platinum metal per 1,000,000 parts by weight of component (A),

(D) about 0.1 to 100 parts by weight of a spherical powder with an average particle size of about 10 μm to 300 μm, and (E) 1–5 parts by weight per 100 parts by weight of component (A) of an organotitanium compound.

2. A silicone rubber based coating composition for air bags which is an addition reaction curing type liquid silicone rubber composition comprising:

(A) 100 parts by weight of a diorganopolysiloxane having a viscosity at 25° C. of about 100 to 100,000 mPa·s and at least two alkenyl groups in each molecule, (B) an organohydrogenpolysiloxane having at least three silicon-bonded hydrogen atoms in each molecule in an amount such that the mole ratio of the silicon-bonded hydrogen atoms in this component to the alkenyl groups in component (A) is within a range of about 0.6:1 to 20:1, (C) a platinum catalyst in an amount providing about 0.1 to 500 parts by weight of platinum metal per 1,000,000 parts by weight of component (A), and (D) about 0.1 to 100 parts by weight of a hollow aluminosilicate powder with an average particle size of about 10 μm to 300 μm.

3. A coated base fabric for air bags produced by coating with a silicone rubber based coating composition comprising:

(A) 100 parts by weight of a diorganopolysiloxane having a viscosity at 25° C. of about 100 to 100,000 mPa·s and at least two alkenyl groups in each molecule, (B) an organohydrogenpolysiloxane having at least three silicon-bonded hydrogen atoms in each molecule in an amount such that the mole ratio of the silicon-bonded hydrogen atoms in this component to the alkenyl groups in component (A) is within a range of about 0.6:1 to 20:1, (C) a platinum catalyst in an amount providing about 0.1 to 500 parts by weight of platinum metal per 1,000,000 parts by weight of component (A), (D) about 0.1 to 100 parts by weight of a spherical powder with an average particle size of about 10 μm to 300 μm, and (E) 1–5 parts by weight per 100 parts by weight of component (A) of an organotitanium compound.

4. A coated base fabric for air bags produced by coating with a silicone rubber based coating composition comprising:

(A) 100 parts by weight of a diorganopolysiloxane having a viscosity at 25° C. of about 100 to 100,000 mPa·s and at least two alkenyl groups in each molecule, (B) an organohydrogenpolysiloxane having at least three silicon-bonded hydrogen atoms in each molecule in an amount such that the mole ratio of the silicon-bonded hydrogen atoms in this component to the alkenyl groups in component (A) is within a range of about 0.6:1 to 20:1, (C) a platinum catalyst in an amount providing about 0.1 to 500 parts by weight of platinum metal per 1,000,000 parts by weight of component (A), and (D) about 0.1 to 100 parts by weight of hollow aluminosilicate powder with an average particle size of about 10 μm to 300 μm.

* * * * *